(12) United States Patent
Liu et al.

(10) Patent No.: US 6,400,533 B1
(45) Date of Patent: Jun. 4, 2002

(54) DISC DRIVE ACTUATOR LATCH SYSTEM FOR HIGH ROTATIONAL SHOCK

(75) Inventors: Joseph Cheng-Tsu Liu; Michael Joo Chiang Toh; Yiren Hong; Chor Shan Cheng; Choon Kiat Lim; Niroot Jierapipatanakul, all of Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 46 days.

(21) Appl. No.: 09/609,199

(22) Filed: Jun. 30, 2000

Related U.S. Application Data

(60) Provisional application No. 60/141,618, filed on Jun. 30, 1999.

(51) Int. Cl.$^7$ ................................................ G11B 5/54
(52) U.S. Cl. ............................... 360/256.5; 360/256.4; 360/256.6
(58) Field of Search ............................... 360/256.5, 105, 360/106, 256, 256.1, 256.2, 256.3, 256.4, 256.6

(56) References Cited

U.S. PATENT DOCUMENTS

| | | | |
|---|---|---|---|
| 4,881,139 A | 11/1989 | Hazebrouck | |
| 5,189,576 A | 2/1993 | Morehouse et al. | |
| 5,208,713 A | 5/1993 | Lindsay et al. | |
| 5,296,986 A | 3/1994 | Morehouse et al. | |
| 5,369,538 A | 11/1994 | Moe et al. | |
| 5,377,065 A | 12/1994 | Morehouse et al. | |
| 5,404,257 A * | 4/1995 | Alt ............................. 360/105 | |
| 5,528,437 A | 6/1996 | Mastache | |
| 5,543,986 A | 8/1996 | Albrecht | |
| 5,555,146 A * | 9/1996 | Hickox et al. ............... 360/105 |
| 5,581,424 A | 12/1996 | Dunfield et al. | |
| 5,612,842 A | 3/1997 | Hickox et al. | |
| 5,623,354 A | 4/1997 | Lien et al. | |
| 5,636,090 A | 6/1997 | Boigenzahn et al. | |
| 5,694,271 A | 12/1997 | Stefansky | |
| 5,717,548 A | 2/1998 | Koester et al. | |
| 5,742,455 A | 4/1998 | Boutaghou | |
| 5,805,384 A | 9/1998 | Bronshvatch et al. | |
| 5,875,075 A | 2/1999 | Hickox | |
| 5,877,922 A | 3/1999 | Boutaghou | |
| 5,973,887 A * | 10/1999 | Cameron ..................... 360/105 |
| 6,028,746 A | 2/2000 | Matsumura | |
| 6,147,841 A * | 11/2000 | Rao ......................... 360/256.2 |
| 6,185,074 B1 * | 2/2001 | Wang et al. .............. 360/256.4 |

* cited by examiner

Primary Examiner—Allen Cao
Assistant Examiner—Dzung C. Nguyen
(74) Attorney, Agent, or Firm—Derek J. Berger; Shawn B. Dempster

(57) ABSTRACT

There is provided an inertial latching system which includes a first latch member configured to engage a second latch member at a junction point. The first latch member includes a latch pivot mounted to the base. One side of the latch pivot extends to form a first arm whilst a balancing mass is found at another side of the latch pivot. Joined to the first arm is a finger which provides a contact line ending in a proximal point. The second latch member has a contact surface which provides a contact point. The inertial latching system is configured such that the ratio of a first length to a second length is smaller than the ratio of a third length to a fourth length. The first length is defined as the distance from the proximal point to the junction point, the second length is defined as the distance from the proximal to the latch pivot, the third length is defined as the distance from the contact point to the junction point, and the fourth length is defined as a distance from the contact point to the actuator pivot.

19 Claims, 4 Drawing Sheets

DISC DRIVE ACTUATOR LATCH SYSTEM FOR HIGH ROTATIONAL SHOCK

This patent application claims priority from U.S. Provisional Application No. 60/141,618, filed Jun. 30, 1999.

FIELD OF INVENTION

The present invention relates generally to actuator latch systems for use in disc drives. More particularly, the present invention relates to an improved inertial latch for dual actuator latch systems.

BACK GROUND OF THE INVENTION

When a disc drive is not in operation, the actuator, which carries the read/write head, is parked, either within a landing zone with its read/write head resting directly on the disc surface or at a parking ramp located off the disc surface. Several types of latches are used for restraining or preventing undesirable movement by a parked actuator.

Air latches are sometimes used, one example of which is described by Hickox et al. in the U.S. Pat. No. 5,555,146 entitled "Anti-Rotation Air Vane Inertia Latch" issued Sep. 10, 1996. An air latch is typically designed to be in a closed position in engagement with the actuator until the disc drive comes into operation and generates the air flow about the spinning discs which opens the air latch to release the actuator. To maintain the start up torque of the disc drive at a reasonably low level, the air latch is typically designed for a maximum latch force of about 30000 radian·s$^{-2}$. Furthermore, to maximize the unlatching force, an air latch is typically designed such that it tends to open when the disc drive experiences an externally induced rotational shock in the potentially most damaging direction. This direction is that which causes the actuator to swing off the parking ramp onto the disc or to swing from the landing zone into the data zone of the disc, resulting in the read/write head coming into abrasive contact with the disc surface and creating possibly irreparable damage to the data stored on the disc. This direction may be clockwise or counter-clockwise depending on the design and relative position of the disc drive components. When the disc drive is spinning down, there is a period of time when the air latch will not be able to perform as intended and thus not be able to guard against even low levels of rotational shock.

A magnetic latch uses magnetic forces to lock the actuator at the desired position, that is, at its parked position. The stronger a magnetic latch is, the more effort is required to overcome the latch force during disc drive start up when the actuator has to be set in motion. This inherent constraint results in the design of magnetic latches which generally do not retain the actuator when the disc drive experiences an external rotational shock of more than 15000 radian·s$^{-2}$.

A conventional inertial latch is typically mounted for rotation about a pivot, and includes a weighted portion and hook portion. In response to a sufficiently strong rotational shock applied to the disc drive, the hook portion rotates about the pivot to engage a receiving hook protruding from the actuator. A biasing mechanism is generally employed to bias the inertial latch in an opened state in which it is not engaged with the actuator. Only when the rotational shock is sufficiently high will the inertial latch overcome the biasing force and move to engage the actuator.

In the U.S. Pat. No. 5,877,922 entitled "Dual Latch Apparatus for Restraining a Direct Access Storage Device Actuator", issued Mar. 2, 1999, Boutaghou proposed a dual latch apparatus which prevents actuator movement at both low and high levels of rotational shock. A magnetic latch assembly or an electromagnetic latch assembly is used to prevent actuator movement in the presence of relatively low levels of rotational shock. A separate inertial latch assembly is employed to restrain the actuator under relatively high levels of rotational shock. However, there exists a transitional range of acceleration levels at which the magnetic latch assembly may allow the actuator to be released before the inertial latch assembly is actuated to restrain the actuator.

The reliability of the actuator latching system can be critical to maintaining the data integrity of a disc drive. Therefore there remains a need for an improved latching system which is more reliable over a continuous range of shock levels, particularly as disc drives are nowadays incorporated into portable devices which significantly increases the risk of a disc drive experiencing an externally induced high rotational shock. The present invention provides an improved solution to meet this need, and offers other advantages over the prior art.

SUMMARY OF THE INVENTION

The present invention relates to an improved disc drive actuator latch system for restraining the read/write head from moving across the disc surface when the disc drive is not in operation. In a disc drive, an actuator is pivotably mounted to the base of a disc drive by an actuator pivot. A yoke extends from the actuator pivot to support a voice coil over a voice coil magnet. The disc drive includes a magnetic latching system which is formed by a third latch member that is joined to the yoke and a fourth latch member that is mounted to the base. There is provided an inertial latching system which includes a first latch member configured to engage a second latch member at a junction point. The first latch member includes a latch pivot mounted to the base. One side of the latch pivot extends to form a first arm whilst a balancing mass is found at another side of the latch pivot. Joined to the first arm is a finger which provides a contact line ending in a proximal point. The second latch member has a contact surface which provides a contact point configured for contact with the contact line.

In a most preferred embodiment of the present invention, the inertial latching system is configured such that the ratio of a first length to a second length is smaller than the ratio of a third length to a fourth length. The first length is defined as the distance from the proximal point to the junction point, the second length is defined as the distance from the proximal to the latch pivot, the third length is defined as the distance from the contact point to the junction point, and the fourth length is defined as a distance from the contact point to the actuator pivot.

The inertial latching system is configured such that the contact line is longer than the second length, and preferably, the contact line is at least five times as long as the second length. The finger is formed such that the contact line is at an obtuse angle with a line joining the proximal point to the latch pivot. The finger is further formed such that a line extending from the actuator pivot to the contact point forms a positive angle with the contact line.

The first latch member preferably includes a secondary magnetic latch configured to bias the first arm away from the yoke. The secondary magnetic latch may be a second arm which extends transversely from the first arm along one side of the voice coil magnet. A ferromagnetic piece of material is supported by the second arm, such that when the second arm is in abutment with the voice coil magnet, the first latch member is not in engagement with the second latch member.

In a most preferred embodiment, the second latch member extends from the yoke in a direction generally perpendicular to the yoke. The disc drive is configured such that the maximum displacement of the contact point is less than the range of the magnetic latching system. The first latch member may further include a pin extending from the first arm in a direction generally perpendicular to the yoke to prevent the first arm from moving under the yoke. The disc drive may also include a post fixed to the base such that when the first arm is in abutment with the post, the second length is at its maximum.

These and various other features as well as advantages which characterize the present invention will be apparent upon reading of the following detailed description and review of the associated drawings.

DETAILED DESCRIPTION

Figure 1:
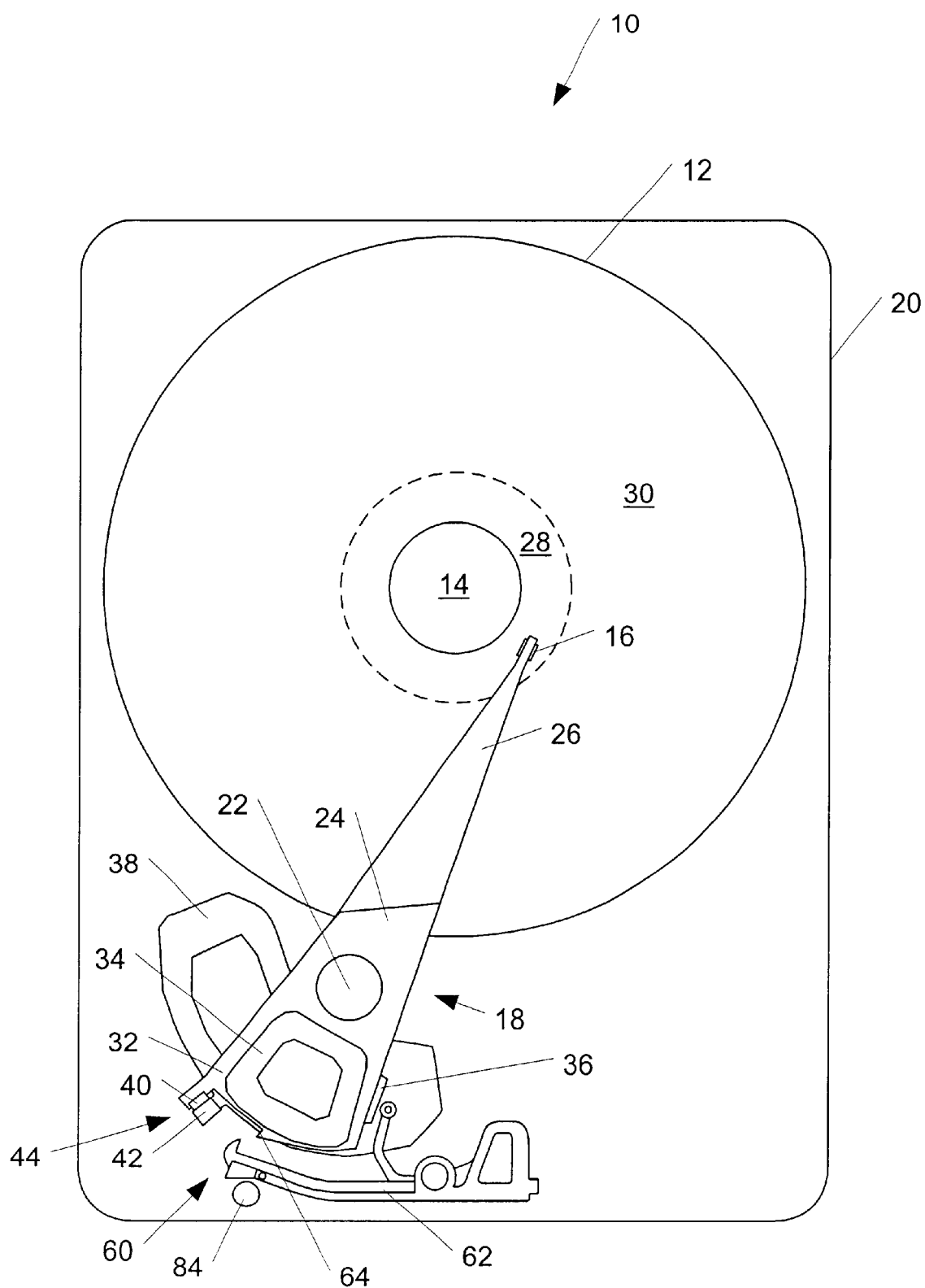
FIG. 1 is a plan view of a disc drive.

Preferred embodiments of the present invention are described in the following with reference to the drawings. FIG. 1 shows a disc drive 10 with one or more discs 12 mounted to a spindle motor 14 for rotation. Data is written to or read from the discs by read/write heads 16. An actuator 18 is operably connected to the read/write heads to position the read/write heads in the desired position. The actuator is rotatably mounted to the base 20 of the disc drive so that it can rotate about an actuator pivot 22, relative to the base. The actuator is coupled to one or more actuator arms 24. At least one suspension 26 is joined to each actuator arm, such that the suspension extends to support a read/write head over a corresponding disc surface.

The actuator is shown in a parked position with the read/write head resting directly in a landing zone 28 on a disc. An external rotational shock in a counter-clockwise direction will thus cause the actuator to swing about an actuator pivot and move into the data zone 30 of the disc. The actuator includes a yoke 32 in a first plane. Attached to the yoke is a voice coil 34 which operates in conjunction with a voice coil magnet 36 to provide the momentum for rotating the actuator about the actuator pivot. A lower voice coil motor plate 38 provides the mounting for the voice coil magnet to the base of the disc drive. An upper voice coil motor plate is not shown.

Extending from the yoke is a magnet 40. When the actuator is in the parked position, the magnet is in contact with a metal stop 42. The metal stop is fixed to the lower voice coil motor plate. The metal stop and the magnet together form a magnetic latching system 44. When the disc drive is not in operation, the magnetic latching system keeps the actuator in its parked position. When the disc drive is started up, the voice coil motor has to provide the required minimum force to overcome the latch force of the magnetic latching system so that the read/write head can be moved over the data zone of the disc for disc drive operations.

Figure 2:
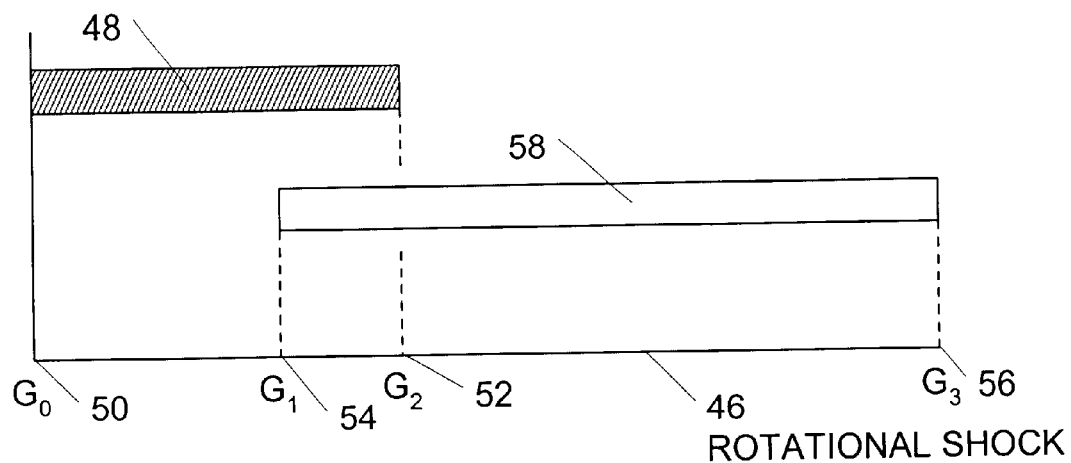
FIG. 2 is a bar chart showing the relative operational ranges of a magnetic latching system and an inertial latching system.

Reference is made to FIG. 2 in which the relative operating ranges of a magnetic latching system and an inertial latching system are shown against externally induced rotational shock 46. The shaded bar 48 extending from a shock level of $G_0$ 50 to $G_2$ 52 represents the range within which the magnetic latching system is effective in holding the actuator stationary. The unshaded bar 58 extending from $G_1$ 54 to $G_3$ 56 represents the range within which the inertial latching system will respond to the external shock and move to restrain the actuator.

In a dual latch system, it is desirable to have a sufficiently wide overlap ($G_1$ to $G_2$) in the two operating ranges so as to avoid the situation in which both the magnetic latch system and the inertial latch system fail to restrain the actuator. One of the advantages of the present invention is in providing a wider range of overlap in the relative operating ranges, in addition to providing more reliable latch performance over the total operating range from $G_0$ to $G_3$.

Figure 3:
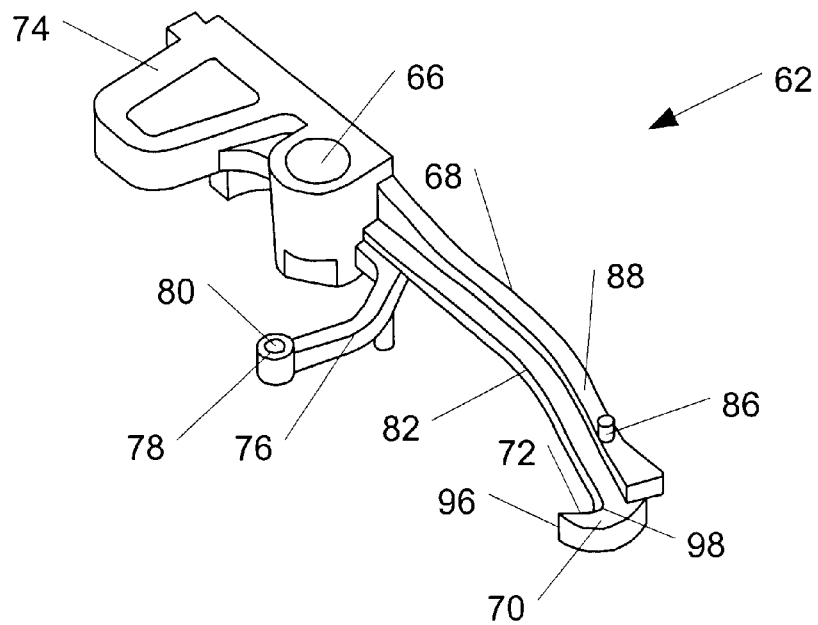
FIG. 3 is a perspective view of a first latch member of an inertial latching system according to a preferred embodiment of the present invention.

According to the present invention, there is provided an improved latching system 60 having a first latch member 62 pivotably mounted to the base of the disc drive and a second latch member 64 fixed to the actuator. Referring to FIG. 3, a most preferred embodiment of the first latch member is shown. The first latch member includes a latch pivot 66 for rotatable mounting to the base of the disc drive. From the latch pivot extends a first arm 68 ending in a finger 70. The finger is shaped with an inner surface 72 for contact with the second latch member. On the other side of the latch pivot is a balancing mass 74. A second arm 76 extends in a direction generally transverse from the first arm and supports a cavity 78 which receive a ferromagnetic piece of material 80. When assembled to the base of the disc drive, an inner side 82 of the first arm is configured to face the yoke of the actuator, as shown in FIG. 1. A post 84 may be located on the base of the disc drive to prevent the first arm from swinging too far away from the actuator. Preferably, a pin 86 juts from a top surface 88 of the first arm so that it will come into abutment with the yoke if the first arm swings too far towards the actuator. In this manner, the pin prevents the first arm from going under and getting stuck under the yoke. When the first latch member is assembled in the disc drive, the second arm is configured such that the ferromagnetic piece is attracted by the voice coil magnet and the second arm rests in abutment with the voice coil magnet. In this situation, the inertial latch is in an opened state and the first latch member is not in engagement with the second latch member.

Figure 4:
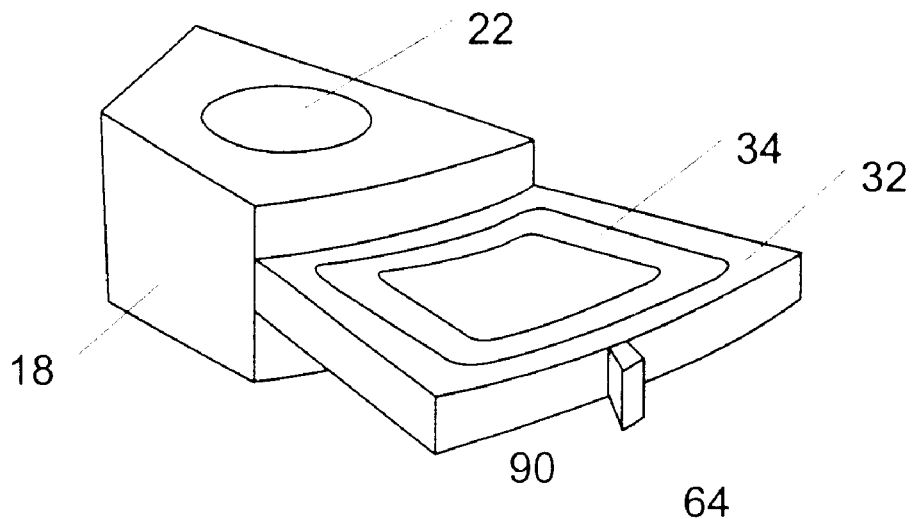
FIG. 4 is a plan view of a second latch member of an inertial latching .system according to the present invention.
Figure 5:
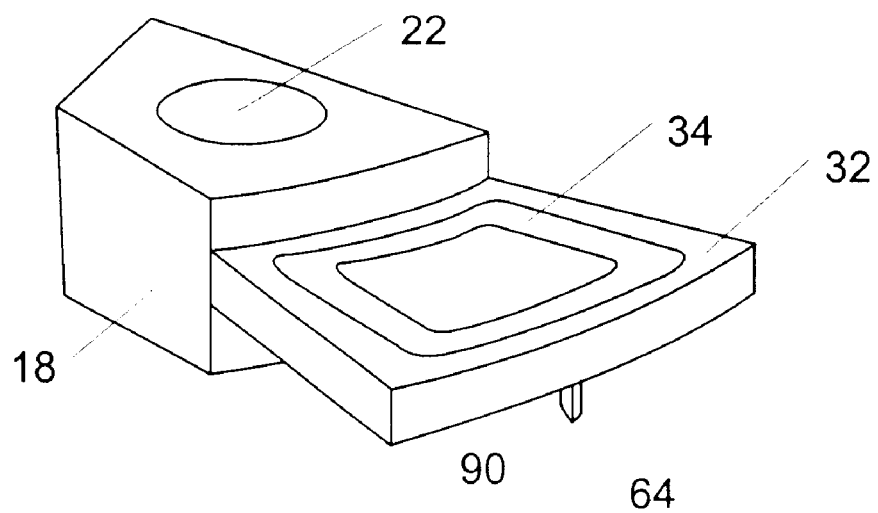
FIG. 5 shows another preferred embodiment of a second latch member.

The second latch member may be fixedly joined to the actuator or, preferably, formed as part of the actuator. In an embodiment illustrated in FIG. 4, the second latch member may extend from the side of the yoke generally in the same plane as the yoke. A contact surface 90 is provided by the second latch member for engagement with the first latch member at a contact point 92. More preferably, as shown in FIG. 5, the second latch member is a catch extending from under the yoke generally perpendicular to the yoke, so that the overall space required by the inertial latching system is less than what is required for a conventional latching system.

Figure 6:
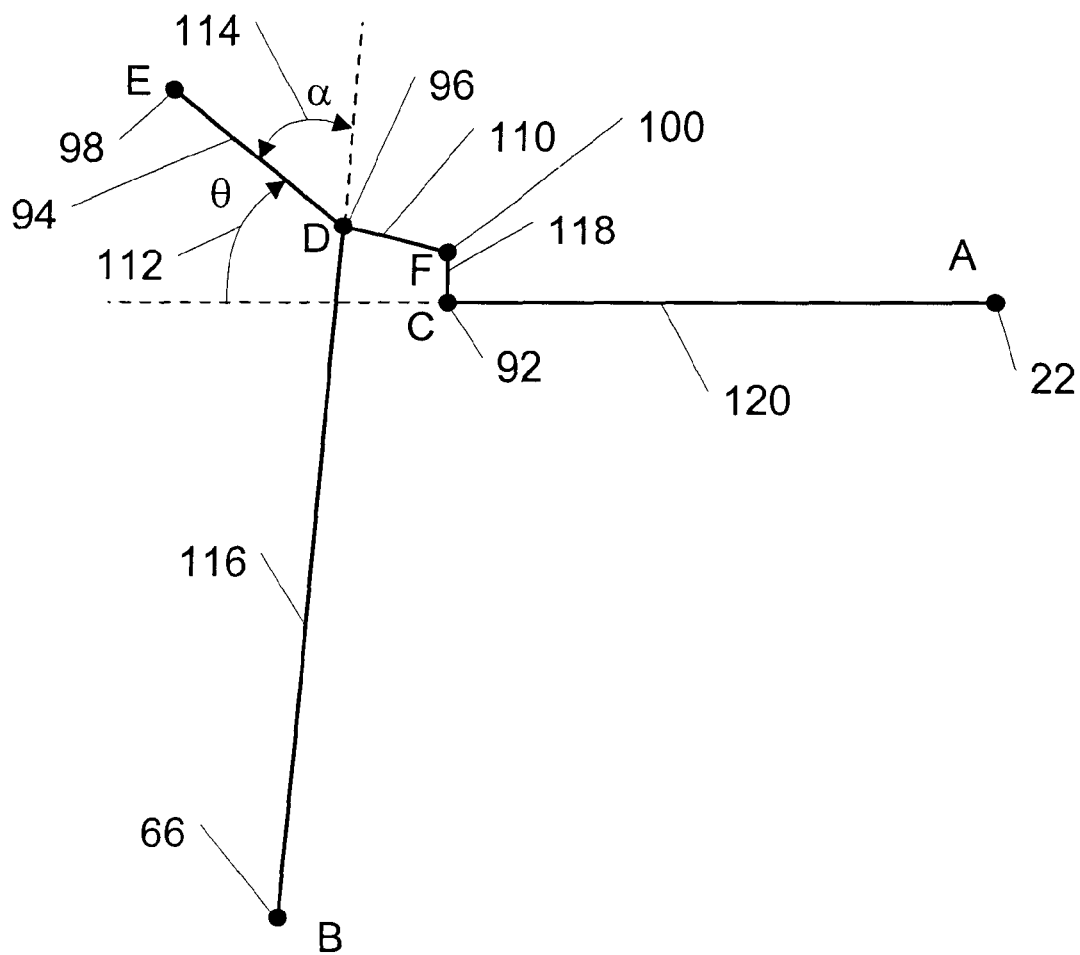
FIG. 6 is a diagram of the relative configurations of an inertial latch of the present invention.

Making reference to FIG. 6, the diagram shows the inertial latching system when it is at rest in its opened state. The actuator pivot 22 is represented by point A and the latch pivot 66 by point B. The point C represents the contact point 92 which is a point on the second latch member that comes into contact with a contact line 94 DE on the first latch member. The point D represents the location of the tip of the finger or the proximal point 96. The point 98 E represents the end of the finger where the finger joins the first arm. For reference, where the contact point C will meet the contact line DE is called the junction point 100, and is represented by the point F. It should be understood that the situation can also be analyzed by assuming that a contact point on the first latch member comes into contact with a contact line on the second latch member.

The inertial latching system is designed such that a rotational shock greater than $G_1$ will overcome the attraction force between the voice coil magnet and the ferromagnetic piece at the second arm. As a result of its own inertia, the first arm will rotate about the latch pivot towards the actuator. The proximal point may travel beyond the junction point. If the rotational shock is greater than $G_2$, the inertia of the actuator overcomes the latch force of the magnetic latching system, and the actuator begins to rotate about the actuator pivot, thus bringing the second latch member and hence the contact point towards the junction point. The inertial latching system of the present invention is configured such that, when the contact point reaches the junction point, it will meet the first latch member along a contact line on the inner surface of the finger, regardless of whether the first latch member is at that time rotating towards or away from the actuator.

To achieve this, the inertial latching system is designed so that it satisfies the condition that a first ratio is smaller than a second ratio. The first ratio is DF/DB, that is the ratio of the distance 110 from the proximal point to the junction point to the distance 116 from the proximal point to the latch pivot. The second ratio is CF/CA, that is the ratio of the distance 118 from the contact point to the junction point to the distance 120 from the contact point to the actuator pivot. It is preferred to have as great a difference between the first ratio and the second ratio as possible.

Preferably, the length of the contact line 94 DE is longer than the distance 110 DF from the proximal point to the junction point. Most preferably, the length of the contact line is at least five times as long as the distance DF. From this, it can be seem that the second latch member of FIG. 5 provides a further advantage in that it does not limit the length of the finger, and hence the length of the contact line.

In addition, the inertial latching system is configured such that once the first latch member and the second latch member come into contact, they will interlock with each other, thereby bringing the inertial latching system into a closed state in which the actuator is prevented from continuing in its rotation. This can be achieved by configuring the contact line DE at a positive angle 112 θ to the extended line AC, as shown in FIG. 6. AC is the radial line from the contact point to the actuator pivot. The angle 114 α between the contact line DE and the radial line BD should be less than 90 degrees. The contact force between the contact point C and the contact line DE will thus push the point C towards the actuator pivot and produce a locking effect between the first latch member and the second latch member, upon contact of these two members. It is found that the present invention enables the inertial latching system to keep the actuator in place even when the disc drive experiences a rotational shock of over 50000 radian·$s^2$. This is a significant improvement over conventional latching devices.

When the shock event is over, the actuator returns to its parked position. To ensure that the actuator will move back, the displacement of the actuator 118 CF is important. The distance CF must be less than the distance or range within which the restoration force of the magnetic latching system is able to pull the actuator back to the parked position. At the same time, the kinetic energy of the actuator during any rebounding between the inertial latching system and the magnetic latching system can be dissipated. This restoration force may, however, vary without having any significant influence on the performance of the inertial latch, and is an added advantage provided by the present invention.

Alternatively, embodiments of the present invention may be described as follows:

In a disc drive 10, an actuator 18 is pivotably mounted to the base 20 of a disc drive 10 by an actuator pivot 22. A yoke 32 extends from the actuator pivot 22 to support a voice coil 34 over a voice coil magnet 36. The disc drive 10 includes a magnetic latching system 44 which is formed by a third latch member 40 that is joined to the yoke 32 and a fourth latch member 42 that is mounted to the base 20. There is provided an inertial latching system 60 which includes a first latch member 62 configured to engage a second latch member 64 at a junction point 100. The first latch member 62 includes a latch pivot 66 mounted to the base 20. One side of the latch pivot 66 extends to form a first arm 68 whilst a balancing mass 74 is found at another side of the latch pivot 66. Joined to the first arm 68 is a finger 70 which provides a contact line 94 ending in a proximal point 96. The second latch member 64 has a contact surface 90 which provides a contact point 92. The inertial latching system 60 is configured such that the ratio of a first length 110 to a second length 116 is smaller than the ratio of a third length 118 to a fourth length 120. The first length 110 is defined as the distance from the proximal point 96 to the junction point 100, and the second length 116 is defined as the distance from the proximal point 96 to the latch pivot 66. The third length 118 is defined as the distance from the contact point 92 to the junction point 100, and the fourth length 120 is defined as the distance from the contact point 92 to the actuator pivot 22.

The inertial latching system 60 is configured such that the contact line 94 is longer than the second length 118, preferably, the contact line 94 is at least five times as long as the second length 118. The finger 70 is formed such that the contact line 94 is at an acute angle 114 with a line joining the latch pivot 66 to the proximal point 96. The finger 70 is further formed such that a line extending from the actuator pivot 22 to the contact point 92 forms a positive angle 112 with the contact line 94.

The first latch member 62 preferably includes a secondary magnetic latch configured to bias the first arm 68 away from the yoke 32. The secondary magnetic latch may be a second arm 76 which extends transversely from the first arm 68 along one side of the voice coil magnet 36. A ferromagnetic piece of material 80 is supported by the second arm 76, such that when the second arm 76 is in abutment with the voice coil magnet 36, the first latch member 62 is not in engagement with the second latch member 64.

In a most preferred embodiment, the second latch member 64 extends from the yoke 32 in a direction generally perpendicular to the yoke 32. The disc drive 10 is configured such that the maximum displacement 118 of the contact point 92 is less than the range of the magnetic latching system 44. The first latch member 62 may further include a pin 86 extending from the first arm 68 in a direction generally perpendicular to the yoke 32 to prevent the first arm 68 from moving under the yoke 32. The disc drive 10 may also include a post 84 fixed to the base 20 such that when the first arm 68 is in abutment with the post 84, the second length 110 is at its maximum.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the exact configuration of the magnetic latching system may be varied, and the exact shape and configuration of the inertial latch can be varied, and can be made very light and slim, while maintaining substantially the same functionality without departing from the scope and spirit of the present invention. The mass or inertia of the component itself is not crucial to the performance of the system. This is a significant advantage as it allows for flexibility in adapting to various disc drive designs. In addition, although the preferred embodiment described herein is directed to a disc drive in which the actuator is parked directly on the disc, it is understood that the present invention may be adapted to disc drives where the actuator is parked off the disc on a ramp. The present invention is also not limited in its application to disc drives where potentially the most damage is done when it experiences an external rotational shock in a counterclockwise direction. It will be appreciated by those skilled in the art that the teachings of the present invention can be applied to other disc drive configurations.

What is claimed is:

1. A disc drive comprising:
   a base;
   an actuator having an actuator pivot, the actuator being rotatably mounted to the base by the actuator pivot;
   an inertial latching system comprising:
      a first latch member comprising:
         a latch pivot mounted to the base;
         a first arm extending from one side of the latch pivot;
         a finger joined to the first arm, the finger providing a contact line ending in a proximal point; and
         a balancing mass located at another side of the latch pivot; and
      a second latch member comprising:
         a contact surface having a contact point; wherein the first latch member is configured to engage the second latch member at a junction point; and wherein the inertial latching system is configured such that a ratio of a first length to a second length is smaller than a ratio of a third length to a fourth length; wherein the first length is defined as a distance from the proximal point to the junction point, the second length is defined as a distance from the proximal point to the latch pivot, the third length is defined as a distance from the contact point to the junction point, and the fourth length is defined as a distance from the contact point to the actuator pivot.

2. A disc drive of claim 1 wherein the contact line is longer than the second length.

3. A disc drive of claim 2 wherein the contact line is at least five times as long as the second length.

4. A disc drive of claim 1 wherein the contact line is inclined at an acute angle with a line joining the proximal point to the latch pivot.

5. A disc drive of claim 1 wherein the contact line is inclined at a positive angle from a line extending from the actuator pivot to the contact point.

6. A disc drive of claim 1 wherein the first latch member includes a secondary magnetic latch configured to bias the first arm away from the actuator.

7. A disc drive of claim 1 wherein the second latch member extends from the actuator in a direction generally perpendicular to a plane of rotation of the actuator.

8. A disc drive of claim 1 wherein the first latch member includes a secondary magnetic latch configured to bias the first arm away from the yoke.

9. A disc drive of claim 8 wherein the secondary magnetic latch comprises:
   a second arm extending transversely from the first arm along one side of the voice coil magnet; and
   a ferromagnetic piece of material supported by the second arm, such that when the second arm is in abutment with the voice coil magnet, the first latch member is not in engagement with the second latch member.

10. A disc drive comprising:
    a base;
    an actuator comprising:
       an actuator pivot for pivotable mounting to the base;
       a voice coil magnet mounted to the base;
       a voice coil; and
       a yoke extending from the actuator pivot and supporting the voice coil over the voice coil magnet;
    a magnetic latching system having a range comprising:
       a third latch member joined to the yoke; and
       a fourth latch member mounted to the base; and
    an inertial latching system comprising:
       a first latch member mounted to the base for movement about a latch pivot between an opened state and a closed state; and
       a second latch member mounted to the actuator, the first latch member having a first contact portion configured to engage the second latch member when the first latch member is in the closed state; and
       a ferromagnetic element configured so that a magnetic field generated by the voice coil magnet resists movement of the first latching element out of the open state.

11. A disc drive of claim 10 wherein the second latch member extends from the yoke in a direction generally perpendicular to the yoke.

12. A disc drive of claim 10 wherein the magnetic latching system is configured such that third latch member and the fourth latch member are attracted to one another when the third latch member is displaced from the fourth latch member by a distance smaller than the range; and wherein the maximum displacement of the first contact portion is less than the range of the magnetic latching system.

13. A disc drive of claim 10 wherein the first latch member further comprises a pin extending in a direction generally perpendicular to the yoke, the first latch member being configured such that the pin is configured to prevent the first latch member from moving under the yoke.

14. A disc drive of claim 10 wherein the disc drive further comprises a post fixed to the base such that the first latch member is in abutment with the post when the first latch member is in the open state.

15. A disc drive comprising:
    a disc surface;
    a read/write head;
    an actuator supporting the read/write head, wherein the actuator is configured to move the read/write head across the disc surface when the disc drive is in operation; and means for restraining the read/write head from moving across the disc surface when the disc drive is not in operation.

16. The disc drive of claim 10 in which the second latch member further comprises a second contact portion configured to contact the first contact portion at a junction point when the first latch member is in the closed position, and in which the inertial latching system is configured such that a ratio of a first length to a second length is smaller than a ratio of a third length to a fourth length when the first latch member is in the open state; in which the first length is defined as a distance from the first contact portion to the junction point, the second length is defined as a distance from the first contact portion to the latch pivot, the third length is defined as a distance from the second contact portion to the junction point, and the fourth length is defined as a distance from the second contact portion to the actuator pivot.

17. The disc drive of claim 10 in which a portion of the first latch member abuts the voice coil magnet when the first latch member is in the open position.

18. The disc drive of claim 10 in which the first latch member comprises an arm having an end proximal to the latch pivot and a distal end, the first contact portion being located at the distal end of the arm.

19. The disc drive of claim 10 in which the first latch member comprises an arm having an end proximal to the latch pivot and a distal end, the ferromagnetic element being located at the distal end of the arm.

* * * * *